United States Patent

Rieger

[11] Patent Number: 5,732,904
[45] Date of Patent: Mar. 31, 1998

[54] DEVICE FOR SIGNATURE REDUCTION

[75] Inventor: Ulrich Rieger, Feldkirchen-Westerham, Germany

[73] Assignee: Daimler-Benz Aerospace AG, Ottobrunn, Germany

[21] Appl. No.: 680,606

[22] Filed: Jul. 16, 1996

[30] Foreign Application Priority Data

Jul. 22, 1995 [DE] Germany .................. 195 26 907.1

[51] Int. Cl.$^6$ ...................................................... B64D 1/08
[52] U.S. Cl. .................. 244/1 R; 244/137.1; 244/137.3; 342/3; 342/10; 428/919
[58] Field of Search ...................... 244/1 R, 130, 244/137.1, 137.3, 138 R, 146, 147, 113; 342/2, 3, 4, 10; 428/919

[56] References Cited

U.S. PATENT DOCUMENTS

| | | | |
|---|---|---|---|
| 2,295,590 | 9/1942 | Manson et al. | 244/138 R |
| 3,315,260 | 4/1967 | Wesch | 342/3 |
| 3,349,397 | 10/1967 | Rosenthal | 342/3 |
| 4,005,655 | 2/1977 | Kleinschmidt et al. | 244/138 R X |
| 4,105,173 | 8/1978 | Bucker | 244/147 X |
| 4,832,288 | 5/1989 | Kendall et al. | 244/138 R X |
| 5,080,165 | 1/1992 | Engelhardt | 342/3 X |
| 5,345,238 | 9/1994 | Eldridge et al. | 342/2 X |

*Primary Examiner*—William Grant
*Attorney, Agent, or Firm*—McGlew and Tuttle

[57] ABSTRACT

A device for the sensor signature reduction of cargo to be dropped from the air comprises a covering that essentially completely surrounds the cargo, which is made of a flexible material having a surface that reflects the expected radar radiation, wherein it is provided with openings for the inlet of ram air.

11 Claims, 2 Drawing Sheets

DEVICE FOR SIGNATURE REDUCTION

FIELD OF THE INVENTION

The present invention pertains to a device for the signature reduction of cargo to be dropped from the air, which comprises a covering that essentially completely surrounds the cargo.

BACKGROUND OF THE INVENTION

Cargo to be dropped from the air, whether it is of a military or civilian nature, is generally tied down on pallets with its usual transport packaging but uncovered, and dropped from a relatively great height. Especially cargo with a fissured metallic contour can easily be detected by means of detection sensors of radar or infrared devices at great distances. This presents a considerable disadvantage especially in the case of military cargo, since, based on the fact of its presence and thus on the resulting possibility of being able to estimate the landing position accurately, effective countermeasures may be introduced. Therefore, it has been desired for a long time to markedly reduce the signature of such cargo.

In order to reduce the signature in the case of earth-bound targets to be protected, it has become known that it is possible to attach a signature-damping material to the surface of the cargo. Such a process is very time-consuming, requires expensive damping material and considerable preparations, which make a rapid use difficult.

In addition, it has become known that it is possible to cover the cargo to be protected with a signature-reducing shell. Such a covering is used, e.g., to ventilate the surface in the rear with ambient air so as to reduce the infrared signature. With corresponding shaping of the shell, which has a nontransparent surface that causes the striking energy to be reflected back to the sender only to a slight extent, and with corresponding contours, the radar signature is also able to be reduced considerably without using expensive damping material, e.g., by means of metallizing the surface. However, such contoured shells protrude and are not consistent with the requirement of accommodating the cargo in the smallest possible transportation space.

SUMMARY AND OBJECTS OF THE INVENTION

Both possibilities must be ruled out for cargo to be dropped from the air since, on the one hand, a very high expense is necessary, and on the other hand, the increased transportation space requirement does not allow the possibility.

Thus, the object of the present invention is to suggest a device for the signature reduction of cargo to be dropped from the air, which requires only a low expense, without protruding contours that increase the transportation space requirement.

Based on the device mentioned in detail in the introduction, this object is accomplished in that the covering comprises a flexible material having a surface that reflects the expected radar radiation, and in that it is provided with openings for the inlet of ram air.

The covering is designed such that it lies closely against the cargo to be protected in the folded-up state, and the openings are arranged in such a manner that, in this state of the covering, they make possible an inlet of air when the cargo is dropped.

It is especially advantageous if the openings are provided with closures that can be operated by remote control.

In a preferred exemplary embodiment, the covering has single-walled and double-walled sections, wherein the latter form pressure chambers, which are distributed in such a manner that they increase the stiffness of the inflated covering. In addition, the covering may be provided with air slits which are used for rear ventilation.

Thus, it is suggested according to the present invention that a flexible covering with a metallized surface be attached to the cargo to be dropped from the air, which covering, after dropping, i.e., during free flight, is brought into the desired, radar-weakening form, and which is able to be stowed against cargo with minimal space requirement during transportation, i.e., during the carry flight, in that, e.g., the covering clings closely to the cargo, or even is folded up similar to a parachute. The free-flight form may be achieved, e.g., in that the covering is inflated by the striking air stream during the free flight.

The device according to the present invention presents the advantage that the high radar signature of a fissured, especially metallic cargo, e.g., of a motor vehicle, is replaced at little expense with the much lower radar signature of a flat surface that is inclined against the perpendicular of the direction of radar radiation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
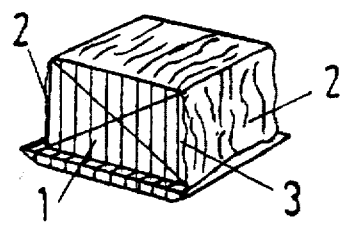
FIG. 1a is a perspective view of the cargo to be dropped with the covering in the carry-flight state.

In the figures, identical parts are designated with the same reference numbers. Thus, 1 designates the cargo to be dropped, which is tied down on a pallet in the conventional manner, e.g., with tightening belts. According to FIG. 1a, the covering now comprises a flexible material that essentially completely surrounds the cargo 1 and has a surface that reflects the expected radar radiation, and this flexible covering, in the carry-flight state, i.e., during the transportation in the aircraft before the dropping procedure, clings to the cargo 1 due to its flexibility, or in the folded-up state, is arranged in hollow spaces of the individual parts. Hardly any additional space requirement is thereby necessary.

Air-inlet openings 3 are arranged at suitable points.

Figure 1B:
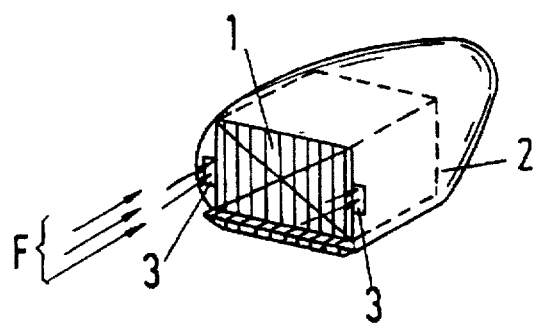
FIG. 1b is a perspective view of the cargo to be dropped with the covering in the free-flight state.

FIG. 1b now shows the dropped cargo in the free-flight state, wherein the flexible covering 2 is inflated by means of the air flowing into the air-inlet openings 3 (direction of flow F), so that it is inflated in an arch-like manner and assumes the shape shown, e.g., in FIG. 1b.

Thus, the high radar signature of a fissured, e.g., metallic cargo, as it is represented by a motor vehicle, is able to be replaced at little expense with the much lower radar signature of a body having flat, sloped surfaces. In the form shown in FIGS. 1a and 1b, the covering, which is used as camouflage, is designed as a pressure chamber, which encloses everything, i.e., the increased internal pressure acts on the entire skin of the covering through the openings 3, e.g., like a wind sock or a paraglider.

Figure 2A:
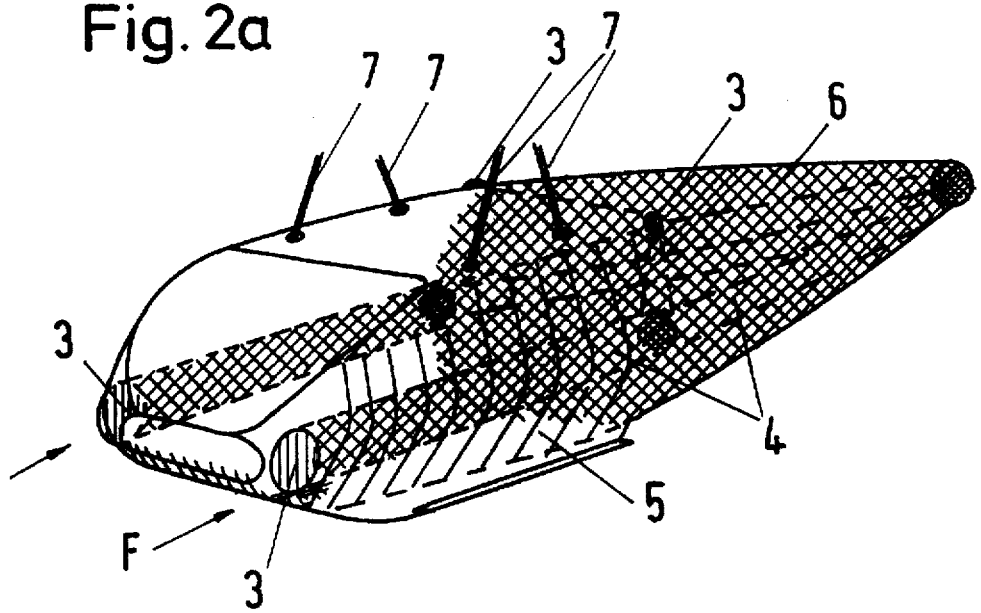
FIG. 2a is a perspective view of the cargo to be dropped with a second exemplary embodiment of the covering in the free-flight state.
Figure 2B:
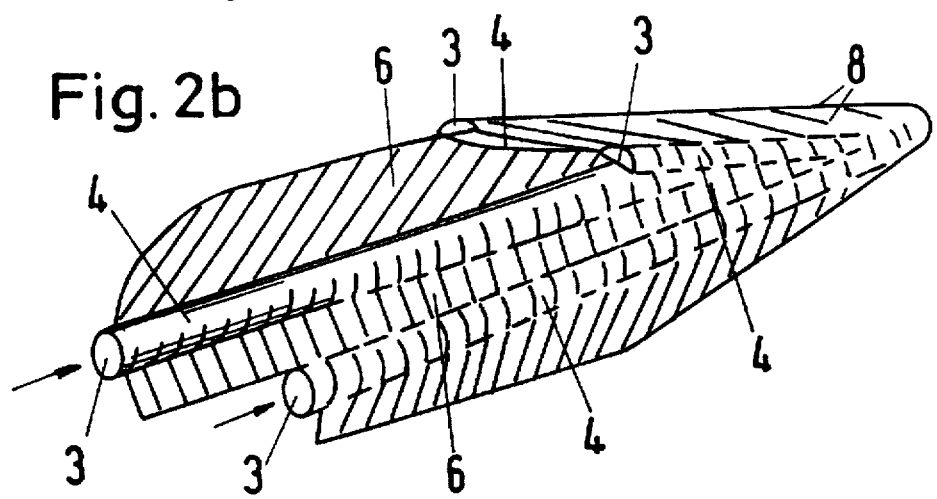
FIG. 2b is a perspective view of a second exemplary embodiment of the covering without the cargo to be dropped.
Figure 2C:
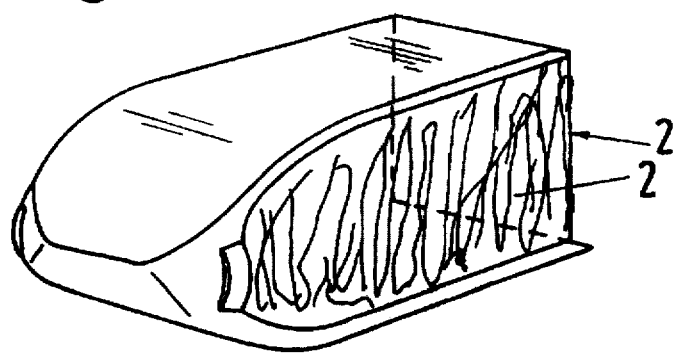
FIG. 2c is a perspective view of the cargo to be dropped with the second exemplary embodiment of the covering in the carry-flight state.

FIGS. 2a–2c show a second, improved exemplary embodiment of a covering according to the present invention, which comprises single-walled sections and double-walled sections incorporated at preselected areas. These double-walled areas are positioned and shaped such that, when they are pressurized, the entire covering, including the single-walled parts, tightens up in the desired shape, wherein the parts of single-walled design form into approximately flat surfaces. In order to reduce the infrared signature, the entire covering is additionally ventilated in the rear, so that the temperature of the single-walled areas is almost identical to the ambient temperature, and only the double-walled areas have a higher temperature.

The connection points to the other structure do not need to be designed as pressure-tight, but are able to contribute to the shaping with their ability to hold the covering.

FIG. 2a shows the second exemplary embodiment, together with the cargo now in the free-flight state. Here, double-walled sections 4, are provided, e.g., laterally and in the tail cone and form tubes which are inflated by means of the ram pressure, i.e., the air flowing in the arrow direction F. Tubular, double-walled sections 5 are arranged in the front part and laterally, are metallized, are made of elastic material and are provided with the openings 3 for ram air. Anchoring struts, e.g., for a parachute, are designated with 7.

FIG. 2b shows the second exemplary embodiment in the isolated position, i.e., without the cargo to be protected, in the free-flight state. Double-walled sections 4, form pressure chambers, which are provided with openings 3 on their front side for ram air.

FIG. 2c shows the second exemplary embodiment of a covering, together with the cargo to be protected in the carry-flight state, and the covering essentially completely surrounds the cargo and is arranged, e.g., in hollow spaces with folded-up parts. For better rear ventilation and thus for reduction of the infrared signature, two air-outlet slits 8 may be provided at suitable points in the covering.

The object is accomplished with this embodiment shown in FIGS. 2a to 2c of a covering for cargo to be dropped from the air, which takes up a negligibly small space in the carry-flight state. The action of ram pressure against it makes possible large-area increases in the outer contours of freely selectable shape with flat surfaces and smooth transitions to the other structure. Such coverings can be produced at little expense, and a material known per se, e.g., plastic fabric or film, may be used as the material for the covering as a rule. The material requirement itself is low as a result of the largely single-walled design; the connections to the other structure do not need to be designed as pressure-tight, i.e., simple, inexpensive attachment means may be used. Based on the use of the ram pressure being generated by the air flow, no separate gas storage means are necessary; since the pressure is always available throughout the flight, high requirements also do not need to be placed on the pressure-tightness of the pressure chambers.

Figure 3A:
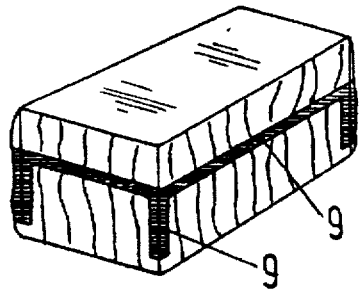
FIG. 3a is a perspective view of another exemplary embodiment in the stowed-away state.
Figure 3B:
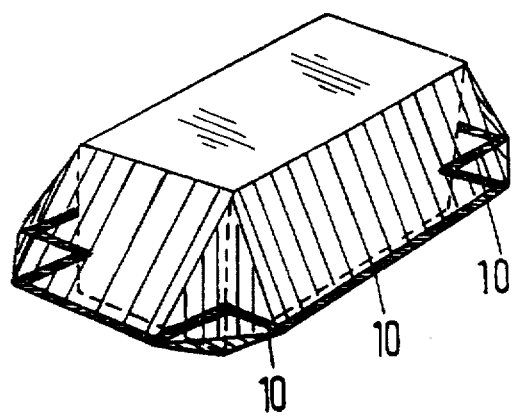
FIG. 3b is a perspective view showing the exemplary embodiment of FIG. 3a in the free-flight state.

FIG. 3a shows another improved exemplary embodiment of a cargo to be dropped in the carry-flight state, and FIG. 3b shows this cargo in the free-flight state. In order to guarantee a further reduction in the radar signature, the surfaces are arranged inclined to the perpendicular of the radar radiation, i.e., to the direction of illumination. To obtain this inclined surface, it is possible to provide inflatable air tubes 9 and/or a rod assembly, which can be folded out and which surrounds the cargo to be dropped at a suitable point; in the carry-flight state shown in FIG. 3a, the rod assembly is or the air tubes are folded closely onto the cargo and thereby fix the shell; in the free-flight state shown in FIG. 3b, it is apparent that, by means of folding out the rod assembly or the fully inflated air tubes, the shell is drawn into a shape, in which it has an angle to the perpendicular of the expected radar radiation.

While specific embodiments of the invention have been shown and described in detail to illustrate the application of the principles of the invention, it will be understood that the invention may be embodied otherwise without departing from such principles.

What is claimed is:

1. A device for the signature reduction of cargo to be dropped from the air, the device comprising: a covering that essentially completely surrounds the cargo, said covering comprising a flexible material having a surface that reflects radar radiation, said covering having openings for the inlet of ram air, said openings cooperating with said covering to inflate said covering and form a substantially predetermined signature reducing outer contour upon inlet of the ram air.

2. A device in accordance with claim 1, wherein said covering is positionable in a folded-up state in which said covering lies closely against the cargo to be protected, and that the said openings are arranged to define inlets for said ram air in the folded-up state for intake of said ram air into the covering when the cargo is dropped.

3. A device in accordance with claim 1, wherein said covering includes single-walled and double-walled sections, said double walled sections forming pressure chambers, which are distributed in such a manner that they increase the stiffness of the inflated covering to enhance said substantially predetermined signature reducing outer contour.

4. A device in accordance with claim 1, wherein said covering includes air slits defining cover rear ventilation means.

5. A device in accordance with claim 1, further comprising a plurality of inflatable air tubes, which are rigidly connected with the covering.

6. An air drop cargo assembly covering device for the radar signature reduction of cargo to be dropped from the air, the device comprising:

cargo having an exterior profile;
covering means that essentially completely surrounds said cargo and for changing between a first storage outer profile and a second signature reducing outer profile, said first outer profile substantially corresponding to said cargo exterior profile and said second outer profile being different from said exterior profile, said covering means comprising a flexible material having a surface that reflects radar radiation, and including deployment means for changing between said first profile and said second profile.

7. A device in accordance with claim 6, wherein said covering means includes a covering positionable in a folded-up state in which said covering lies closely against the cargo to form said first profile, said deployment means comprising openings in said covering arranged to define an inlet for air in the folded-up state for intake of ram air into the covering to inflate said covering when the cargo is dropped.

8. A device in accordance with claim 7, wherein said covering includes single-walled and double-walled sections, said double walled sections forming pressure chambers, which are distributed in such a manner that they increase the stiffness of the inflated covering and provide a substantially predetermined outer contour.

9. A device in accordance with claim 4, wherein said covering includes air slits defining cover rear ventilation means.

10. A device in accordance with claim 6, further comprising a plurality of inflatable air tubes, which are rigidly connected with the covering means.

11. A device for the signature reduction of cargo to be dropped from the air, the device comprising: a covering that essentially completely surrounds the cargo, said covering comprising a flexible material having a surface that reflects radar radiation, said covering having openings for the inlet of ram air to inflate said covering, said covering includes single-walled and double-walled sections, said double walled sections forming pressure chambers, which are distributed in such a manner that they increase the stiffness of the inflated covering to provide a substantially predetermined signature reducing outer contour.

* * * * *